US009219653B2

(12) United States Patent
Arcese et al.

(10) Patent No.: US 9,219,653 B2
(45) Date of Patent: Dec. 22, 2015

(54) RESOURCE MANAGEMENT WITH CONDITIONED POLICIES

(71) Applicant: International Business Machines Corporation, Armonk, NY (US)

(72) Inventors: Mauro Arcese, Rome (IT); Gianluca Bernardini, Rome (IT); Stefano Sidoti, Rome (IT)

(73) Assignee: Internatioanal Business Machines Corporation, Amonk, NY (US)

( * ) Notice: Subject to any disclaimer, the term of this patent is extended or adjusted under 35 U.S.C. 154(b) by 163 days.

(21) Appl. No.: 14/173,504

(22) Filed: Feb. 5, 2014

(65) Prior Publication Data

US 2014/0244821 A1 Aug. 28, 2014

(30) Foreign Application Priority Data

Feb. 28, 2013 (GB) .................................. 1303621.5

(51) Int. Cl.
*G06F 15/173* (2006.01)
*H04L 12/24* (2006.01)

(52) U.S. Cl.
CPC ........ *H04L 41/0893* (2013.01); *H04L 41/0813* (2013.01)

(58) Field of Classification Search
USPC .................. 709/223, 200, 203, 219
See application file for complete search history.

(56) References Cited

U.S. PATENT DOCUMENTS

| 8,032,557 | B1 * | 10/2011 | Vijendra | G06Q 10/06 707/783 |
| 8,104,043 | B2 | 1/2012 | Padisetty et al. | |
| 2002/0029278 | A1 | 3/2002 | Shiouchi et al. | |
| 2006/0020801 | A1 | 1/2006 | D'Alo et al. | |
| 2012/0311154 | A1 * | 12/2012 | Morgan | G06F 9/5072 709/226 |
| 2013/0263209 | A1 * | 10/2013 | Panuganty | H04L 43/04 726/1 |
| 2014/0143825 | A1 * | 5/2014 | Behrendt | G06F 21/552 726/1 |

FOREIGN PATENT DOCUMENTS

GB 2354350 B 3/2004

* cited by examiner

*Primary Examiner* — El Hadji Sall
(74) *Attorney, Agent, or Firm* — Yee & Associates, P.C.; Joesph Petrokaitis (57) ABSTRACT

A resource management solution based on management policies is provided, where each management policy comprises an indication of a management activity and at least one of the management policies comprising an indication of an application condition. A corresponding method comprises deploying a set of operative management policies assigned to each one of a set of target computing machines onto the target computing machine to cause the target computing machine to verify the application condition of each assigned operative management policy according to status information available on the target computing machine.

12 Claims, 6 Drawing Sheets

RESOURCE MANAGEMENT WITH CONDITIONED POLICIES

This Application claims the benefit of priority to United Kingdom Patent Application Serial No. GB 1303621.5, filed on Feb. 28, 2013, the contents of which are hereby incorporated by reference.

DESCRIPTION

1. Technical Field

The solution according to one or more embodiments of the present invention relates to the data-processing field. More specifically, this solution relates to the resource management field.

2. Background

Resource management is a key activity in modern data-processing systems (for example, in large enterprises). For this purpose, various resource management tools are available for facilitating the management of multiple target computing machines (or simply targets) from a server computing machine (or simply server) of the data-processing system.

Particularly, resource management tools based on the concept of management policies (or simply policies) have been proposed in the last years. In a policy-based resource management tool, a set of policies (each one indicating a management activity and a possible application condition) is defined. The policies are deployed selectively onto the targets; each target periodically verifies the application conditions of the corresponding policies and then applies the policies with no application condition or having the application conditions being satisfied by executing the corresponding management activities. Generally, each target further uploads an outcome of the application of each policy onto the server, which maintains configuration information of the whole data-processing system accordingly. In this way, the verification and execution logic of the resource management tool is distributed throughout the targets, thereby reducing the workload of the server.

A problem of the policy-based resource management tools is the control of the sequence of application of the policies on the targets (for example, when a policy can be applied on a target only after the application of one or more other policies on other targets). Indeed, in the resource management tools conforming to a pure policy-based paradigm, wherein the verification of the application conditions is performed entirely on the targets, this is not possible since each target is not aware of the status of the other targets.

In order to solve this problem, a possible approach might be of adding an engine on the server that sequences the deployment of the policies onto the targets according to the application outcomes of other policies that have already been applied. However, the above-mentioned technique undermines the policy-based paradigm, since the whole logic required to orchestrate the sequence of application of the policies on the targets is concentrated on the server. This significantly increases the workload of the server, which may become a bottleneck adversely affecting the performance and the scalability of the resource management tool.

Moreover, US-A-2006/0020801 (the entire disclosure of which is herein incorporated by reference) discloses a self-adaptive management system, wherein an authority publishes rules defining target configurations of corresponding categories of subjects, and a supervisor publishes a current stage of a workflow of application of the rules. Each subject retrieves and applies the rules of its category corresponding to the current stage, and then publishes information about its compliance with them. Once all the subjects have become compliant with their rules, the supervisor updates the current stage accordingly.

On the contrary, U.S. Pat. No. 8,104,043 (the entire disclosure of which is herein incorporated by reference) discloses a cooperative technique for the execution of tasks on networked computers without any centralized coordination thereof. For this purpose, instructions for executing a sequence of tasks are provided to a first computer, which processes the instructions and forwards them to the other computers. Each computer executes the tasks assigned thereto and uses peer-to-peer communications to provide corresponding status update to the other computers so as to allow them to synchronize and coordinate the execution of the tasks.

However, this requires a direct communication among all the computers, which very often is not available (for example, because of security issues). Moreover, the above-described technique is based on a completely distributed paradigm, which does not allow having any global information about the execution of the tasks on all the computers; therefore, this technique may be unsuitable in most practical situations (for example, because of auditing issues).

SUMMARY

The solution according to one or more embodiments of the present invention is based on the idea of sequencing the application of the policies with other policies.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a resource management method based on management policies, wherein a set of service management policies is created each one having a management activity configured to update status information of each target computing machine, wherein the service management policy is applied according to an application outcome of at least one operative management policy (which status information is used to verify a possible application condition of each management policy).

A further aspect of the solution according to an embodiment of the invention provides a corresponding computer program (and a corresponding computer program product).

A further aspect of the solution according to an embodiment of the invention provides a corresponding system.

BRIEF DESCRIPTION OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DESCRIPTION OF EMBODIMENTS

Figure 1:
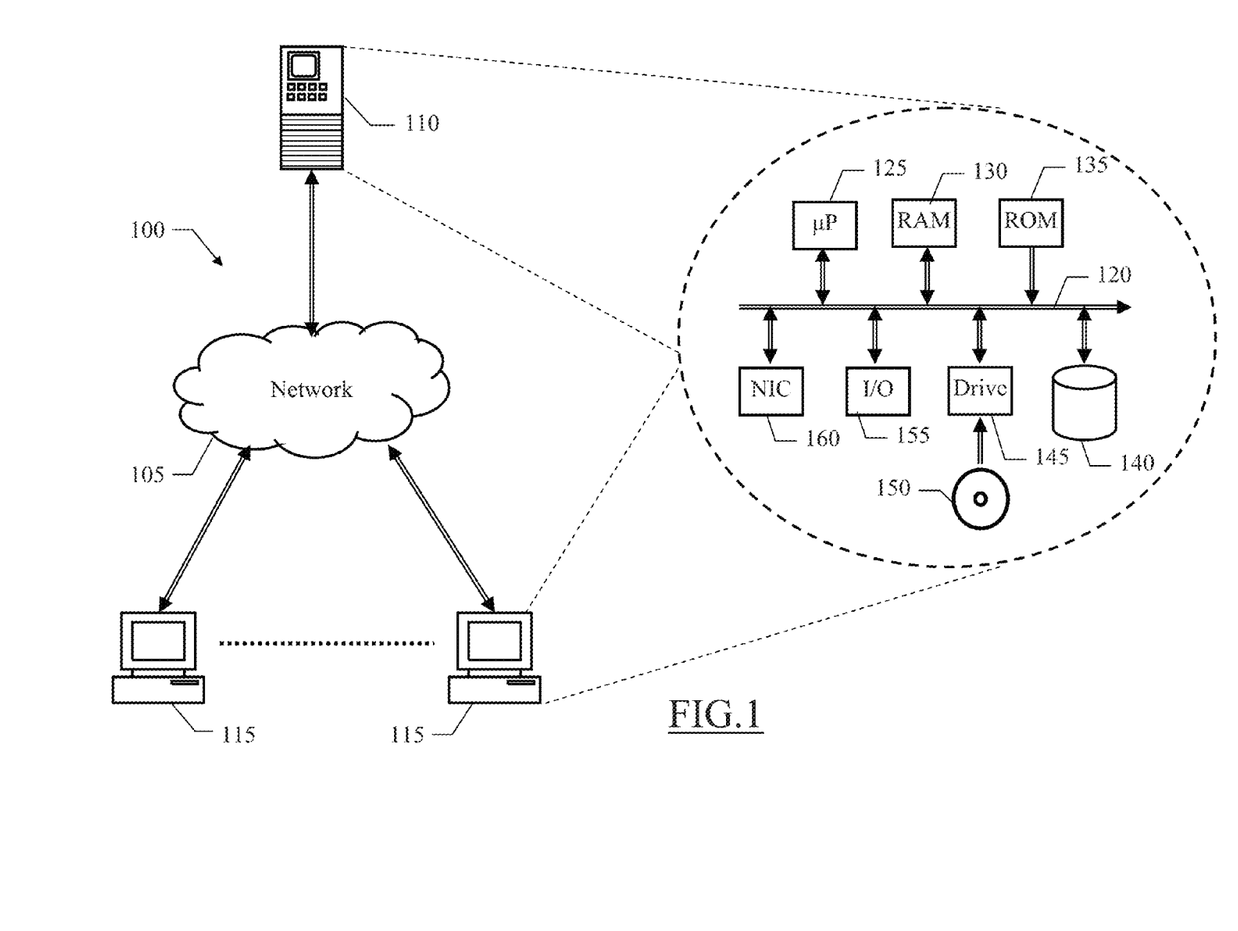
FIG. 1 shows a block-diagram of a data-processing system in which the solution according to an embodiment of the invention may be applied, FIG. 2A

With reference in particular to the FIG. 1, a block-diagram is shown of a data-processing system 100 in which the solution according to an embodiment of the invention may be applied.

The data-processing system 100 has a distributed architecture, wherein multiple computing machines are connected one to another through a communication network 105 (for example, a LAN). One of the computing machines (or more), referred to as server computing machine (or simply server) 110, controls the management of the other computing machines, referred to as target computing machines (or simply targets) 115, by means of a policy-based resource management tool (as described in detail in the following).

Each (server and target) computing machine 110,115 comprises several units that are connected in parallel to a bus structure 120 (with an architecture that is suitably scaled according to the actual function of the computing machine 110,115 in the data-processing system 100). In detail, one or more microprocessors (μP)) 125 control operation of the computing machine 110,115; a RAM 130 is used as a working memory by the microprocessors 125, and a ROM 135 stores basic code for a bootstrap of the computing machine 110,115. The computing machine 110,115 is also provided with a mass-memory comprising one or more hard-disks 140 and drives 145 for reading/writing optical disks 150 (for example, CDs or DVDs). Moreover, the computing machine 110,115 has input/output (I/O) units 155 (for example, a keyboard, a mouse, and a monitor). A network adapter (NIC) 160 is used to connect the computing machine 110,115 to the network 105.

A pictorial representation of an exemplary application of the solution according to an embodiment of the invention is shown in the FIG. 2A-FIG. 2D.

Figure 2A:
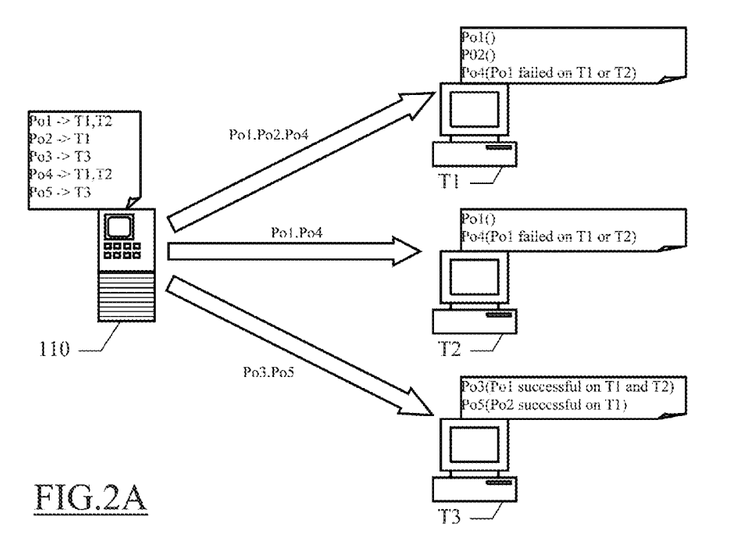

Starting from the FIG. 2A, a set of management policies (or simply policies) are defined on the server 110 for their application on selected targets (for example, three targets denoted with the references T1, T2 and T3). Each policy comprises an activity (What) section that defines a management activity to be executed during the application of the policy on each target; the management activity is formed by one or more instructions of whatever type (for example, copy a file, run a command, and the like). The policy may also comprise a condition (When) section that defines an application condition to be verified for enabling the application of the policy on each target. The application condition is formed by one or more expressions combined with whatever logic operators (for example, NOT, AND, OR, and the like); in turn, each expression is based on status information relating either to the same target where the policy is to be applied or to other targets. Each policy is assigned to one or more targets where it has (possibly) to be applied.

For example, the following policies are defined to implement the actual resource management of the targets T1-T3 (so that they will be referred to hereinafter as operative policies). Particularly, an operative policy Po2 with no application condition is assigned to the targets T1,T2 (Po1( )→T1,T2), an operative policy Po2 with no application condition is assigned to the target T1 (Po2( )→T1 ), an operative policy Po3 conditioned to the successful application of the operative policy Po1 both on the target T1 and on the target T2 is assigned to the target T3 (Po3(Po1 successful on T1 and T2)→T3), an operative policy Po4 conditioned to the failed application of the operative policy Po1 on the target T1 or on the target T2 is assigned to the targets T1,T2 (Po4(Po1 failed on T1 or T2)→T1,T2), and an operative policy Po5 conditioned to the successful application of the operative policies Po2 on the target T1 is assigned to the target T3 (Po5(Po2 successful on T1 )→T3). The operative policies assigned to each target T1-T3 are then deployed thereon; in this way, the target T1 receives the operative policies Po1,Po2,Po4, the target T2 receives the operative policies Po1,Po4, and the target T3 receives the operative policies Po3,Po5.

Figure 2B:
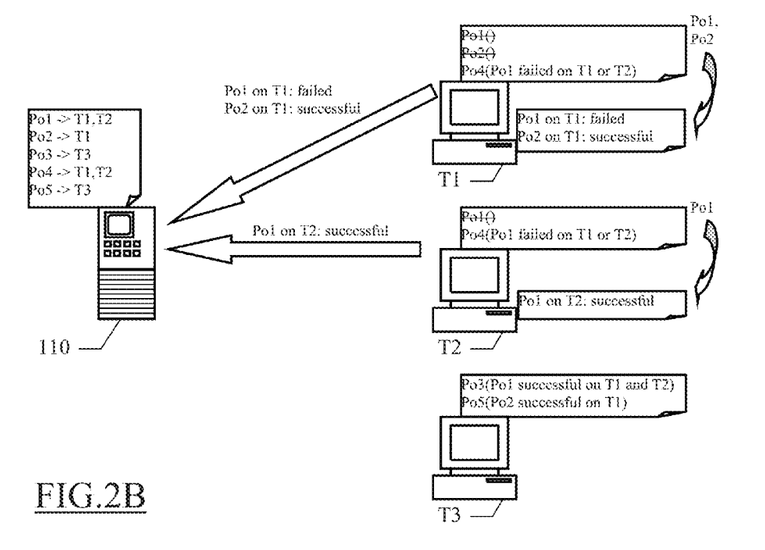

Moving to the FIG. 2B, on each target T1-T3 the application conditions of the corresponding policies still to be applied (if any) are verified according to the corresponding status information; each policy with no application condition or each policy whose application condition is satisfied is then applied on the target. In the specific situation at issue, on the target T1 the operative policies Po1 and Po2 (both of them with no application conditions) are applied (while the application condition of the operative policy Po4 cannot be verified yet), on the target T2 the operative policy Po1 (with no application condition) is applied (while the application condition of the operative policy Po4 cannot be verified yet), and on the target T3 no policy is applied (since the application conditions of the operative policies Po3,Po5 cannot be verified yet). For example, on the target T1 the application of the operative policy Po1 failed and the application of the operative policy Po2 succeeded, whereas on the target T2 the application of the operative policy Po1 succeeded. Each target T1-T3 updates the corresponding status information according to an outcome (i.e., successful or failed) of the application of each corresponding policy (i.e., (Po1 on T1: failed), (Po2 on T1: successful) for the target T1, and (Po1 on T2: successful) for the target T2). Each target T1-T3 also uploads the corresponding application outcomes onto the server 110.

Figure 2C:
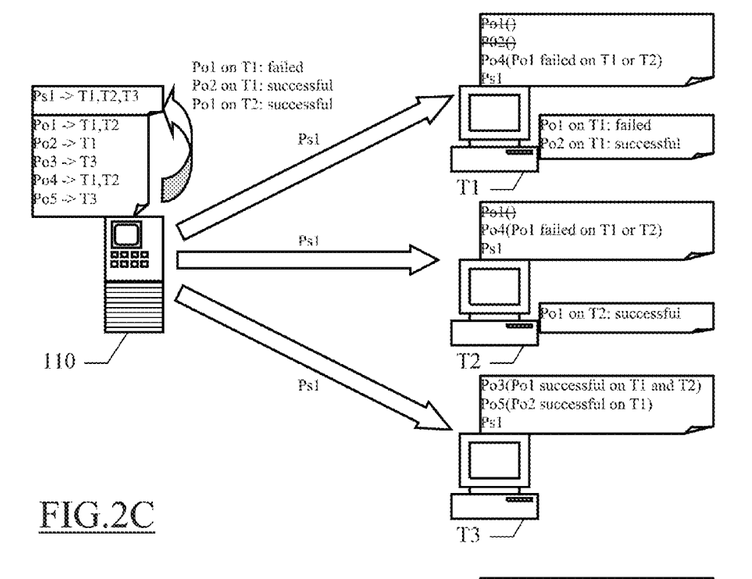

In response thereto, as shown in the FIG. 2C, the server 110 creates a set of further policies, each one for one of more of the operative policies that have been applied, according to the corresponding application outcomes. As described in the following, these policies are used to control the sequence of execution of the operative policies Po1-Po5 (so that they will be referred to hereinafter as service policies). Particularly, a service policy Ps1 (with no application condition) is created for notifying the failed application of the operative policy Po1 on the target T1, the successful application of the operative policy Po2 on the target T1 and the successful application of the operative policy Po1 on the target T2. The service policy Ps1 is assigned to all the targets T1-T3 and it is then deployed thereon.

Figure 2D:
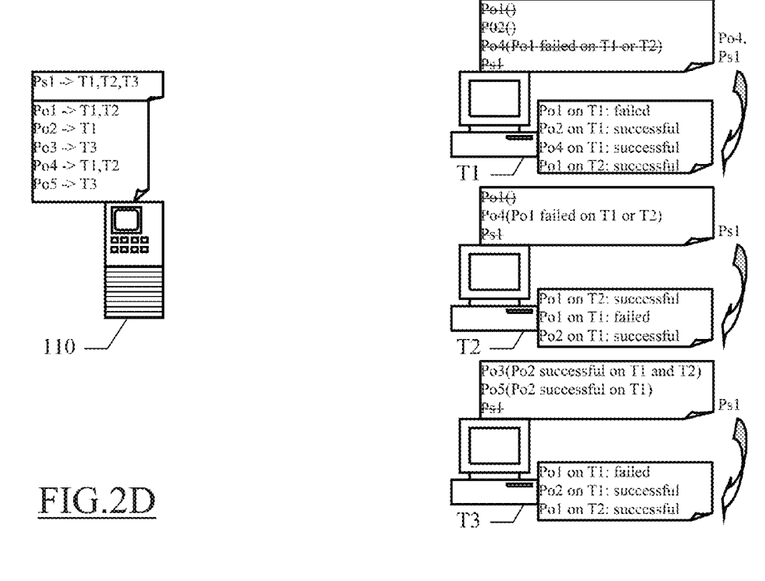
-FIG. 2D shows a pictorial representation of an exemplary application of the solution according to an embodiment of the invention.

Considering now the FIG. 2D, on each target T1-T3 the application conditions of the corresponding policies still to be applied are verified as above for enabling their application. In this case, on the target T1 the operative policy Po4 (since the application of the operative policy Po1 failed on the target T1) and the service policy Ps1 (with no application condition) are applied (while the operative policies Po1,Po2 have already been applied), on the target T2 the service policy Ps1 (with no application condition) is applied (while the operative policy Po1 has already been applied and the application condition of the operative policy Po4 cannot be verified yet), and on the target T3 the service policy Ps1 (with no application condition) is applied (while the application conditions of the operative policies Po3,Po5 cannot be verified yet). The execution of the management activity of the service policy Ps1 on each target T1-T3 updates the corresponding status information accordingly. Particularly, on the target T1 the operative policy Po4 adds its application outcome, for example, being successful (i.e., (Po4 on T1: successful) and the service policy Ps1 adds the application outcome of the operative policy Po1 on the target T2 (i.e., (Po1 on T2: successful), on the target T2 the service policy Ps1 adds the application outcomes of the operative policies Po1,Po2 on the target T1 (i.e., (Po1 on T1: failed) and (Po2 on T1: successful)), and on the target T3 the service policy Ps1 adds the application outcomes of the operative policies Po1,Po2 on the targets T1,T2 (i.e., (Po1 on T1: failed), (Po2 on T1: successful) and (Po1 on T2: successful)).

Therefore, when on each target T1-T3 the application conditions of the corresponding policies still to be applied are verified again for enabling their application, now the operative policy Po4 is applied on the target T2 (since it is possible to determine that the application of the operative policy Po1 failed on the target T1), and the operative policy Po5 is applied on the target T3 (since it is possible to determine that the application of the operative policy Po2 succeeded on the target T1).

The above-described solution allows controlling the sequence of application of the (operative) policies on the targets by making them aware of the status of the other targets. However, this result is achieved without undermining the policy-based paradigm. Indeed, the verification and execution logic of the resource management tool remains on the targets (whose operation is substantially unchanged). This solution only involves the addition of a very simple logic on the server (for creating the service policies), which has a negligible impact on its workload (so as to limit any risk of creating a bottleneck in the server that might adversely affect performance and scalability).

At the same time, this solution does not require any direct communication among the targets (so that it is of general applicability, even when this direct communication is not available, for example, because of security issues). Moreover, it allows gathering global information about the application of the (operative) policies on all the targets by the server (for example, for auditing purposes).

Figure 3:
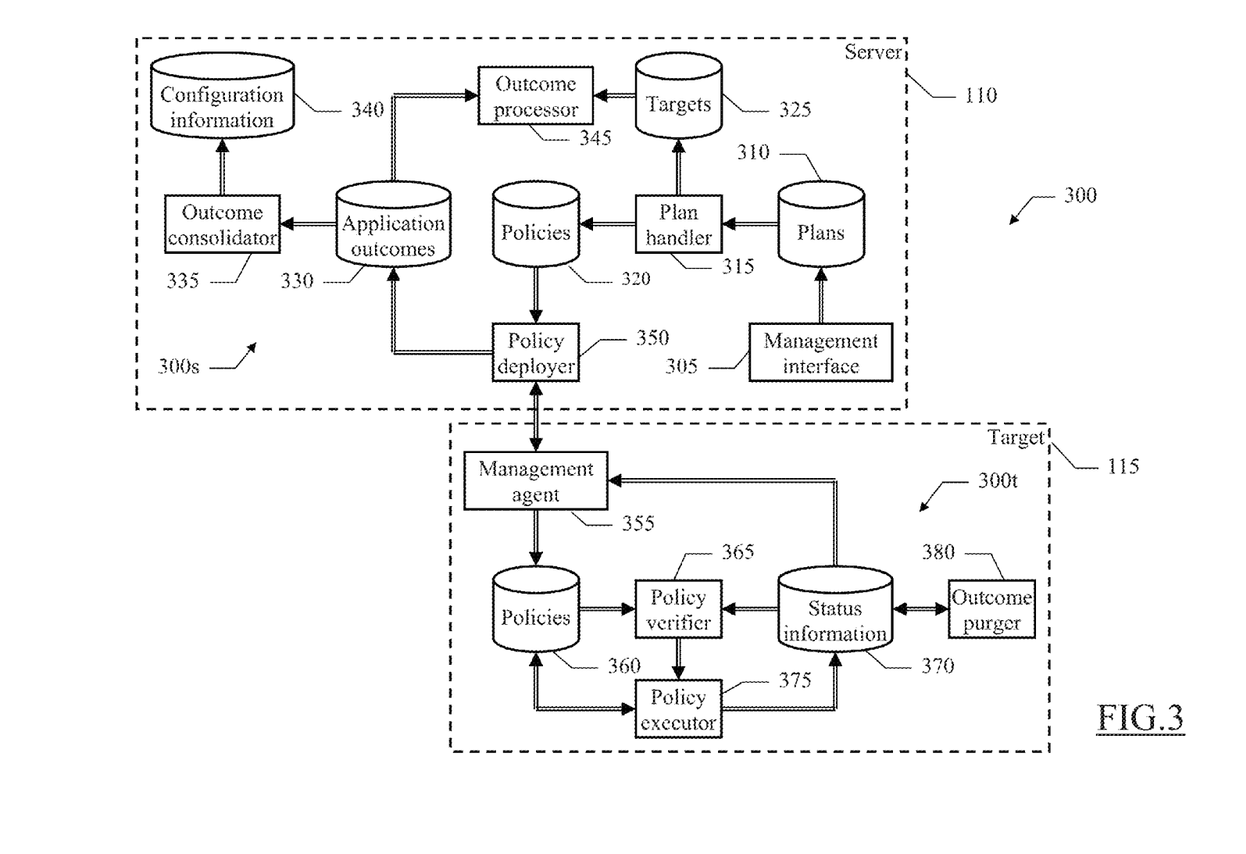
FIG. 3 shows the main software components that may be used to implement the solution according to an embodiment of the invention.

The main software components that may be used to implement the solution according to an embodiment of the invention are shown in the FIG. 3.

These software components are part of a management tool that is denoted as a whole with the reference 300. The information (programs and data) is typically stored in the hard-disk and loaded (at least partially) into the working memory of each (server or target) computing machine when the programs are running, together with an operating system and other application programs (not shown in the figure). The programs are initially installed onto the hard disk, for example, from optical disks. In this respect, each component may represent a module, segment or portion of code which comprises one or more executable instructions for implementing the specified logical function (or more).

Particularly, the server 110 runs a server-component of the resource management tool 300 (denoted with the reference 300s) for managing the targets 115 (only one shown in the figure).

The server-component of the resource management tool 300s comprises a management interface 305 (for example, a GUI or a CLI), which allows a user, consisting of either a person or a software application, to define management plans (or simply plans) to be submitted on the data-processing system (for example, to create, update, validate and delete them). For this purpose, the management interface 305 controls a repository 310 that stores the definitions of all the plans. Each plan comprises an indication of a set of actions to be performed on selected targets. The plan also comprises control information about the execution of the actions on the corresponding targets; particularly, this control information may define a sequence of execution of the actions on the targets (according to their results) and an expected completion time of the plan.

A plan handler 315 accesses the repository 310 of the plans. For each new plan that is submitted for execution, the plan handler 315 creates a corresponding set of operative policies, which is stored into a corresponding repository 320. Particularly, an operative policy is created for each action of the plan. The management activity of the operative policy comprises one or more instructions required to execute the action; moreover, if the execution of the action is conditioned on the result of one or more other actions, the application condition of the operative policy comprises corresponding expressions defining the execution sequence of the corresponding operative policies. Each operative policy is assigned (for its application) to the targets where the corresponding action has to be executed. At the same time, the plan handler 315 creates a list of all the targets 115 involved by the execution of the plan. The lists of the targets of all the plans are stored into a corresponding repository 325.

A repository 330 stores the application outcomes of the last policies that have been applied in the corresponding targets 115. An outcome consolidator 335 accesses the repository 330 of the application outcomes, and it controls a further repository 340 that stores configuration information of all the targets 115 (as defined by a compliance of each target 115 to the assigned operative policies resulting from their successful application thereon). For each new application outcome of the repository 330, the outcome consolidator 335 updates the repository 340 of the configuration information accordingly.

An outcome processor 345 accesses both the repository 330 of the application outcomes and the repository 325 of the targets. For each bunch of new application outcomes of the repository 330, the outcome processor 345 creates the corresponding service policies. Each service policy is then associated with all the targets of the corresponding plan (extracted from the repository 325). The service policies are then added as above to the repository 320.

A policy deployer 350 accesses the repository 320 of the (operative and service) policies. For each new bunch of policies of the repository 320 (i.e., the operative policies of a new plan or the service policies of a new bunch of application outcomes), the policy deployer 350 controls the deployment of these policies onto the corresponding targets 115.

Moving now to the target 115, it runs a target-component of the management tool 300 (denoted with the reference 300t) for managing the application of the assigned policies thereon.

The target-component of the resource management tool 300t comprises a management agent 355 continuously running in the background. The management agent 355 receives the assigned (operative and service) policies from the server 110, and stores them into a corresponding repository 360.

A policy verifier 365 accesses the repository 360 of the policies. For each new policy of the repository 360, the policy verifier 365 verifies its application condition. For this purpose, the policy verifier 365 accesses a repository 370 that stores the status information of the relevant targets (defined by the application outcomes of the policies that have been applied thereon).

The policy verifier 365 controls a policy executor 375. For each policy that has no application condition or whose application condition is satisfied, the policy executor 375 enforces its application by controlling the execution of the corresponding management activity (whose definition is extracted from the repository 360). The policy executor 375 updates the repository 370 of the status information according to the application outcome of the policy. Moreover, if the application of the policy succeeded, the policy executor 375 also deletes it from the repository 360. The repository 370 of the status information is further accessed by the management agent 355; the management agent 355 uploads each new application outcome of the repository 370 onto the server 110 (for its addition to the repository 330). An outcome purger 380 further accesses the repository 370 of the status application; the outcome purger 380 purges the repository 370 by removing the obsolete application outcomes.

Figure 4A:
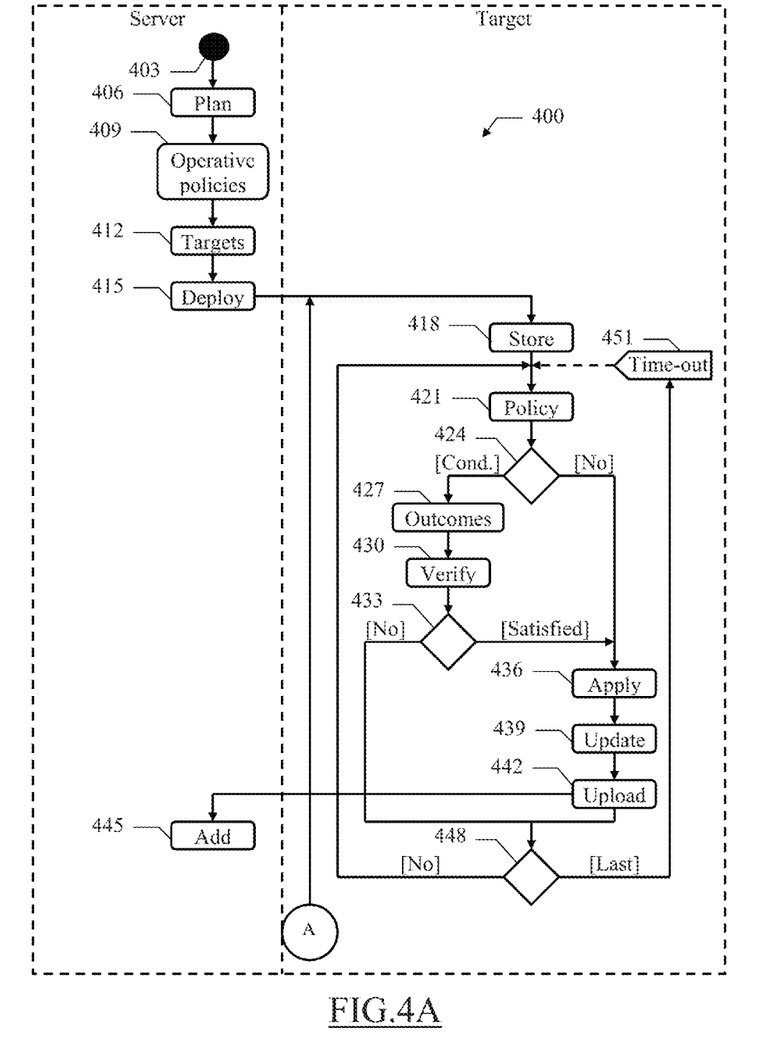
FIG. 4A-FIG. 4B show an activity diagram describing the flow of activities relating to an implementation of the solution according to an embodiment of the invention.
Figure 4B:
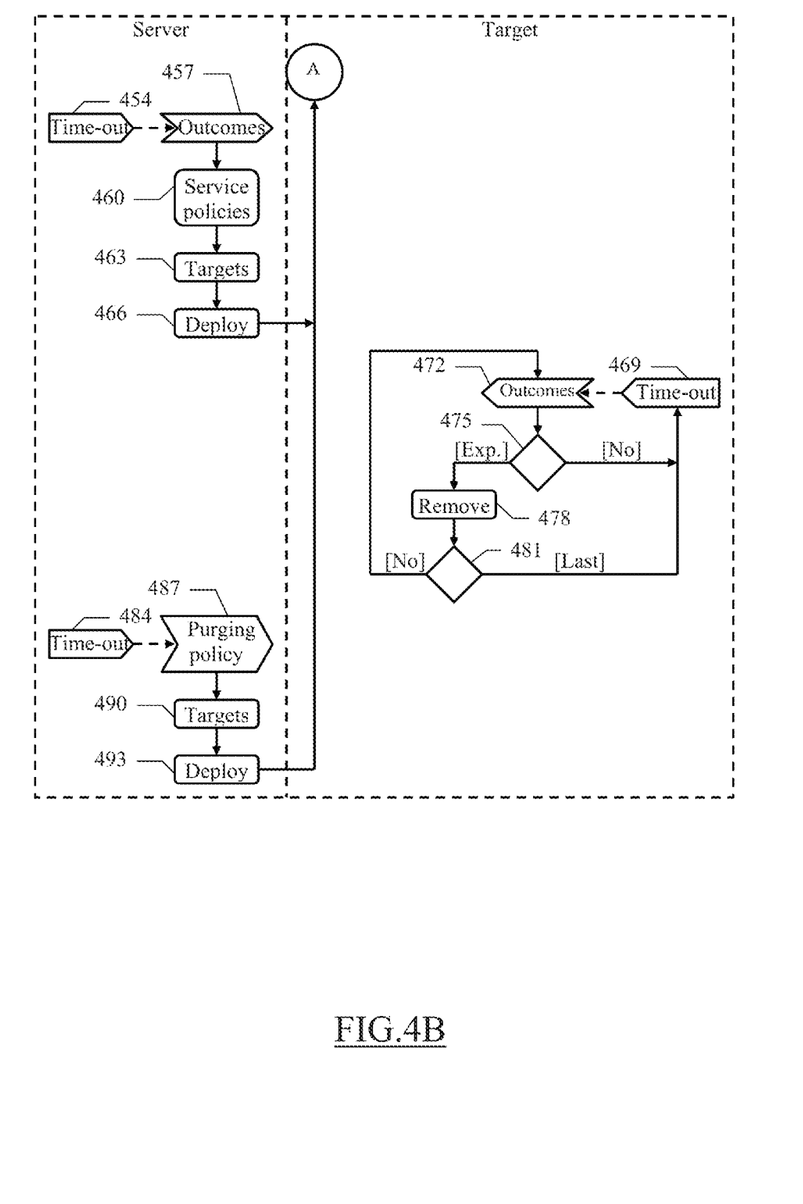

An activity diagram describing the flow of activities relating to an implementation of the solution according to an embodiment of the invention is shown in the FIG. 4A-FIG. 4B.

Particularly, the diagram represents an exemplary process that may be used to execute a generic plan with a method 400.

The method 400 begins at the black start circle 403 in the swim-lane of the server, and then it passes to block 406 as soon as the plan is submitted for execution. The plan is identified by a corresponding unique plan ID, and each action thereof is identified by a unique activity ID of the corresponding management activity together with a unique target ID (for example, the hostname) of each target where it has to be executed. In response thereto, the operative policies of the plan are created and added to the corresponding repository at block 409. Each policy is identified by a unique policy ID formed by the corresponding plan ID and activity ID. Moreover, the list of all the targets of the plan (defined by the union of the target IDs corresponding to all the operative policies thereof) is created and stored into the corresponding repository at block 412. The server then triggers the deployment of these operative policies onto the corresponding targets at block 415 (for example, by sending a command to each target comprising the policy IDs of the operative policies assigned thereto).

In response thereto, each target at block 418 downloads its (operative) policies, and stores them into the corresponding repository. The application of these new policies is then enforced on the target. For this purpose, the definition of each (outstanding) policy still to be applied on the target is extracted from the corresponding repository at block 421. A test is then made at block 424 to determine whether the policy has an application condition. If so, the status information required to verify the application condition of the policy (i.e., the application outcomes defined by parameters of its expressions) is searched in the corresponding repository at block 427. The application condition of the policy is then verified at block 430. The flow of activity branches at block 433 according to the result of this verification.

Particularly, if the application condition is satisfied the policy is applied onto the target at block 436 by executing the corresponding management activity (i.e., running its commands). The same point is also reached directly from the block 424 if the policy has no application condition. Continuing to block 439, the status information of the target is updated according to the application outcome of the policy (i.e., successful or failed). At the same time, if the application of the policy succeeded, it is also removed from the corresponding repository. The application outcome (identified by a unique outcome code) of the policy (identified by its policy ID) on the target (identified by its target ID) is then uploaded onto the server at block 442. In response thereto, the server adds this application outcome to the corresponding repository at block 445 (and it updates the configuration information of the data-processing system accordingly).

Returning to the swim-lane of the target, the flow of activity descends from the block 442 into block 448. The same point is also reached directly from the block 433 when the application condition of the policy cannot be verified (because the required status information is not available) or when it is not satisfied, so that the policy cannot be applied yet. In any case, a test is now made to determine whether the last outstanding policy has been processed. If not, the method returns to the block 421 to repeat the same operations on a next outstanding policy.

Conversely, once all the outstanding policies have been processed, the method enters a waiting condition at block 451. As soon as a pre-defined time-out expires (for example, every 1-30 min), the flow of activity passes from the block 451 to the block 421 to reiterate the same operations. In this way, the application of the outstanding policies is tried periodically so as to enable it as soon the corresponding application conditions become satisfied.

With reference now to the swim-lane of the server, the method passes from block 454 to block 457 as soon as a pre-defined time-out expires (for example, every 1-30 min.). In response thereto, the new application outcomes that have been added to the corresponding repository after the previous expiration of the same time-out are extracted (and removed) therefrom. The service policies corresponding to these new application outcomes are then created at block 460. For this purpose, the new application outcomes are grouped by plan (as indicated by their plan IDs). A single service police is created for each plan having one or more new application outcomes. The service policy has no application condition and comprises a management activity for setting the application outcome of each corresponding operative policy into the status information of each target wherein it is applied. For example, the service policy may be created from a template policy whose management activity comprises a generic instruction for updating the status information, which instruction reads the application outcomes to be set from a customization file; the customization file (for example, in the XML format) comprises an element for each application outcome to be set, which element has child elements containing the corresponding target ID, policy ID and outcome code. This limits the number of service policies that are created and deployed (i.e., only one per plan at each iteration), with a beneficial effect on the network traffic. As a further improvement, the customization file may also comprise an expiration time (for example, in an additional child element). For example, the expiration time may be set equal to the completion time of the plan (extracted from the corresponding repository). Each service policy is then associated with all the targets of its plan (extracted from the corresponding repository) at block 463.

The server then triggers the deployment of these service policies onto the corresponding targets at block 466 as above. In this way, each service policy is provided only to the targets that may be impacted by the corresponding application outcomes, with a beneficial effect on the network traffic and the workload of the targets. In response thereto, each target executes the same operations described above at the blocks 421-448 (possibly with the exception of the uploading of the application outcome of the service policies onto the server, so as to limit the network traffic). Particularly, each service policy is always applied on each target (since it has no application condition). This causes the execution of its management activity, which updates the status information accordingly. Particularly, its instruction reads each application outcome from the customization file, and it adds this application outcome (possibly replacing a previous version thereof) to the repository of the status information. Moreover, the instruction may also associate the application outcome with the expiration time of the service policy and/or with a time-stamp.

Referring back to the swim-lane of the target, the method passes from block 469 to block 472 as soon as a pre-defined time-out expires (for example, every 1-2 days). In response thereto, a loop is performed for purging the status information. For this purpose, a (current) application outcome is extracted from the repository of the status information, starting from the oldest one as indicated by its expiration time. A test is then made at block 475 to verify whether the expiration time has lapsed (i.e., it is older than the current time). If so, the application outcome is removed from the repository of the status information at block 478. A further test is made at block 481 to determine whether the last application outcome has been processed. If not, the method returns to the block 472 to repeat the same operations on an immediately newer application outcome. The method instead returns to the block 469 (waiting for a next expiration of the corresponding time-out) from the block 481 if all the application outcomes have been processed or from the block 475 if the expiration time of the application outcome has not lapsed yet. In this way, it is possible to prevent any indefinite growing of the repository of the status information on the target.

In addition or in an alternative, the method passes from block 484 to block 487 in the swim-lane of the server as soon as a pre-defined time-out expires (for example, every 1-2 days). In response thereto, a dedicated policy is created for purging the status information (hereinafter, referred to as purging policy). Particularly, the purging policy has no application condition and comprises a management activity for removing application outcomes that meet a purging criterion from the repository of the status information of each target wherein it is applied. For example, as above the purging policy may be created from a template policy whose management activity comprises a generic instruction (for removing the application outcomes), which instruction reads the purging criterion from a customization file (for example, in the XML format). For example, the purging criterion may indicate the removal of the application outcomes that are older than a predefined threshold value or that belong to one or more completed plans. The purging policy is associated with all the targets of all the plans (as indicated in the corresponding repository) at block 490.

The server then triggers the deployment of this purging policy onto the corresponding targets at block 493 as above. In response thereto, each target executes the same operations described above at the blocks 421-448 (possibly avoiding uploading the application outcome of the purging policy onto the server, so as to limit the network traffic). Particularly, the purging policy is always applied on each target (since it has no application condition). This causes the execution of its management activity, which removes the application outcomes meeting its purging criterion from the repository of the status information. In this way, it is possible to perform a clean-up of the repository of the status information on the target, by removing application outcomes that are obsolete (for example, because very old or because belonging to completed plans).

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, an embodiment of the invention provides a resource management method, which is based on management policies; each management policy comprises an indication of a management activity and at least one of the management policies comprises an indication of an application condition. The resource management method comprises the following steps. A set of (one or more) operative management policies assigned to each one of a set of (one or more) target computing machines is deployed onto the target computing machine (so as to cause the target computing machine to verify the application condition of each assigned operative management policy according to status information available on the target computing machine and to apply each assigned operative management policy with no application condition or having the application condition being satisfied by executing the corresponding management activity). An indication of an application outcome of each applied operative management policy is received. A set of (one or more) service management policies each one for at least one of the applied operative management policies is created according to the corresponding application outcome; the management activity of each service management policy is configured to update the status information of the target computing machine wherein the service management policy is applied according to the application outcome of the corresponding at least one applied operative management policy. A set (one or more) of the service management policies assigned to each one of a set of (one or more) selected target computing machines is deployed onto the selected target computing machine (so as to cause the selected target computing machine to apply each assigned service management policy by executing the corresponding management activity).

However, the method may be used to manage any (software and/or hardware) data-processing resources. Moreover, the management policies may be in any number and of any type.

Particularly, each management activity may comprise any type and number of instructions (either at an abstract level or directly executable on the targets) for executing any type of actions and/or each application condition may comprise any type and number of expressions, combined with any operators. Moreover, the application condition may depend on any property (even unrelated from the application of the management policies), either of the target computing machine where the management policy is to be applied and/or of other target computing machines. The management policies may be deployed onto the target computing machines in any way (for example, with the target computing machines that periodically verify their availability in a corresponding depot). Likewise, the application outcomes may be received in any way (for example, with a polling procedure). The service management policies may be of any type and number (for example, with application conditions for limiting their application only when it is necessary). Moreover, the service management policies may be created in any way, for example, from any template policy, with a customization file in any format (such as a plain text file), or even completely from scratch (such as when the application outcomes are hard-coded in their management activities). The service management policies may be deployed in any way as above, to any number of target computing machines (see below).

In an embodiment of the invention, the step of creating a set of service management policies is performed periodically for the application outcomes being received during a corresponding period.

However, the service management policies may be created at any time (for example, in response to the receipt of each application outcome).

In an embodiment of the invention, the status information of each target computing machine is stored in a corresponding memory structure of the target computing machine. In an embodiment of the invention, the application of each assigned service management policy on each selected target computing machine causes the target computing machine to add an indication of the application outcome of each corresponding applied operative management policy to the memory structure of the selected target computing machine.

However, the memory structure may be of any type (for example, a text file or a data-base), and it may be stored anywhere (for example, in a shared storage device). Moreover, the status information may have any format (for example, with a record for each target computing machine storing the application outcomes of all the management policies applied thereon).

In an embodiment of the invention, the step of creating a set of service management policies comprises associating an expiration attribute to each service management policy; the application of each assigned service management policy on each selected target computing machine causes the target computing machine to associate the corresponding expiration attribute to each application outcome being added to the memory structure. The method further comprises removing each application outcome from the memory structure of each target computing machine according to the corresponding expiration attribute.

However, the expiration attribute may defined in any way (for example, according to a progress of the corresponding management plan), even independently of the completion time of the management plan (for example, by adding a pre-defined delay to the current time). The expiration attribute may also be of any type, even independent of the service management policy (for example, a time-stamp of the addition of the application outcome to the memory structure).

Moreover, the expiration attribute may be used in any way to purge the memory structure (for example, by removing the application outcomes older than a threshold value).

In an embodiment of the invention, a purging management policy is provided. The management activity of the purging management policy is configured to remove each application outcome according to a purging criterion. The purging management policy is deployed onto each target computing machine (so as to cause the target computing machine to apply the purging management policy by executing the corresponding management activity).

However, the purging management policy may be of any type (for example, with application conditions for limiting its application selectively). Moreover, the purging management policy may be provided in any way (either using pre-defined management policies, customizing a template policy or creating it from scratch), and it may be deployed in any way (see above), even only to selected target computing machines (for example, according to their status). In any case, the purging criterion may be of any type (see below).

In an embodiment of the invention, the purging criterion is based on an age of the application outcomes. However, the age of the application outcomes may be defined in any way (for example, by their expiration times).

In an embodiment of the invention, the method further comprises the following steps. A plurality of management plans are provided; each management plan comprises an indication of a set of actions to be executed on a corresponding set of the target computing machines according to an execution sequence. A corresponding set of the operative management policies is created for each management plan; the management activities and the application conditions of the operative management policies of the plan are defined according to the actions and the execution sequence, respectively, of the plan.

However, the management plans may be defined in any way (for example, directly in terms of management activities or management policies). Moreover, the operative management policies of each management plan may be created in any way (for example, by grouping multiple actions into their management activities). In any case, the operative management policies may also be provide in any other way (even without the definition of any management plan).

In an embodiment of the invention, the step of creating a set of service management policies comprises creating a single service management policy for the application outcomes of each management plan received during the corresponding period.

However, the service management policies may be created in any number for each management plan, or even completely independently of the management plans (for example, with a common service management policy for all of them).

In an embodiment of the invention, the step of deploying a set of service management policies comprises deploying each service management policy onto all the target computing machines of the corresponding management plan.

However, the service management policies may be deployed to any number of target computing machines, for example, only where it is necessary or indiscriminately to all of them (independently of the management plans).

In an embodiment of the invention, the purging criterion is based on the belonging of the application outcomes to at least a completed one of the plans.

However, different, alternative or additional purging criteria may be defined (for example, according to the outstanding operative management policies). In any case, the above-described purging techniques may be used in alternative, in combination or they may even be omitted all together.

Generally, similar considerations apply if the same solution is implemented with an equivalent method (by using similar steps with the same functions of more steps or portions thereof, removing some steps being non-essential, or adding further optional steps). Moreover, the steps may be performed in a different order, concurrently or in an interleaved way (at least in part).

A further embodiment of the invention provides a computer program comprising code means for causing a computing machine to perform the steps of the above-described resource management method when the computer program is executed on the computing machine.

A further embodiment of the invention provides a computer program product comprising a non-transitory computer readable medium embodying a computer program, the computer program comprising code means directly loadable into a working memory of a computing system thereby configuring the computing system to perform the same method.

However, the above-described solution may be implemented as a stand-alone module, as a plug-in for the resource management tool, or even directly in the resource management tool itself. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium (s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment of the invention provides a system comprising means for performing the steps of the above-described resource management method.

However, this method may also be carried out on a system based on a different architecture (for example, a local, wide area, global, cellular or satellite network), and exploiting any type of (wired and/or wireless) connections. However, its implementation on virtual machines of a stand-alone computer is not excluded.

Generally, similar considerations apply if the system has a different structure or comprises equivalent components, or it has other operative characteristics. In any case, every component thereof may be separated into more elements, or two or more components may be combined together into a single element. Moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A resource management method based on management policies, each management policy comprising an indication of a management activity and at least one of the management policies comprising an indication of an application condition, wherein the method comprises steps of:
   deploying a set of operative management policies assigned to each one of a set of target computing machines onto a target computing machine to cause the target computing machine to verify the application condition of each assigned operative management policy according to status information available on the target computing machine and to apply each assigned operative management policy with no application condition or having the application condition being satisfied by executing the corresponding management activity;
   receiving an indication of an application outcome of each applied operative management policy;
   creating a set of service management policies each one for at least one of the applied operative management policies according to the corresponding application outcome, the management activity of each service management policy being configured to update the status information of the target computing machine, wherein the service management policy is applied according to the application outcome of the corresponding at least one applied operative management policy; and
   deploying a set of the service management policies assigned to each one of a set of selected target computing machines onto the selected target computing machine to cause the selected target computing machine to apply each assigned service management policy by executing the corresponding management activity.

2. The method according to claim 1, wherein the step of creating a set of service management policies is performed periodically for the application outcomes being received during a corresponding period.

3. The method according to claim 2, wherein the step of creating a set of service management policies comprises:
   creating a single service management policy for the application outcomes of each management plan received during the corresponding period.

4. The method according to claim 1, wherein the status information of each target computing machine is stored in a corresponding memory structure of the target computing machine, the application of each assigned service management policy on each selected target computing machine causing the target computing machine to add an indication of the application outcome of each corresponding applied operative management policy to the memory structure of the selected target computing machine.

5. The method according to claim 4, wherein the step of creating a set of service management policies comprises a step of:
   associating an expiration attribute to each service management policy, the application of each assigned service management policy on each selected target computing machine causing the target computing machine to associate the corresponding expiration attribute to each application outcome being added to the memory structure, the method further comprising a step of:
   removing each application outcome from the memory structure of each target computing machine according to the corresponding expiration attribute.

6. The method according to claim 4, further comprising steps of:
   providing a purging management policy, the management activity of the purging management policy being configured to remove each application outcome according to a purging criterion; and
   deploying the purging management policy onto each target computing machine to cause the target computing machine to apply the purging management policy by executing the corresponding management activity.

7. The method according to claim 6, wherein the purging criterion is based on an age of the application outcomes.

8. The method according to claim 1, further comprising steps of:
   providing a plurality of management plans each one comprising an indication of a set of actions to be executed on a corresponding set of the target computing machines according to an execution sequence; and
   creating a corresponding set of the operative management policies for each management plan, the management activities and the application conditions of the operative management policies of the plan being defined according to the actions and the execution sequence, respectively, of the plan.

9. The method according to claim 8, wherein the step of deploying a set of service management policies comprises:
   deploying each service management policy onto all the target computing machines of the corresponding management plan.

10. The method according to claim 8, wherein the purging criterion is based on the belonging of the application outcomes to at least a completed one of the plans.

11. A computer program product comprising a non-transitory computer readable storage medium embodying a computer program, the computer program comprising program code loadable into a working memory of a computing system to configure the computing system to perform the method of claim 1.

12. A system comprising a data processor operatively coupled to a memory having program code stored therein that is operable, when executed by the data processor, for performing the method of claim 1.

* * * * *